Nov. 8, 1949           R. O. PERRINE           2,487,172
CONTROL OF SHUNT FIELD GENERATORS
Filed Sept. 9, 1948
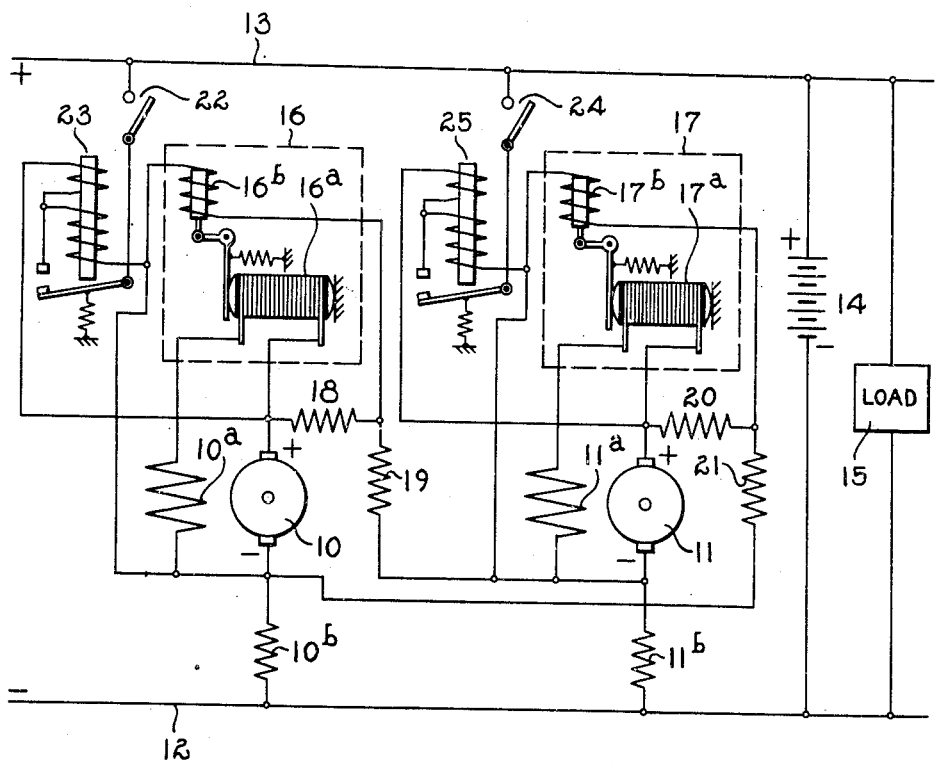
Inventor
Robert O. Perrine
By Frank W Hubbard
Attorney Patented Nov. 8, 1949

2,487,172

UNITED STATES PATENT OFFICE 2,487,172

CONTROL OF SHUNT FIELD GENERATORS

Robert O. Perrine, Wauwatosa, Wis., assignor to Cutler-Hammer, Inc., Milwaukee, Wis., a corporation of Delaware Application September 9, 1948, Serial No. 48,473

2 Claims. (Cl. 171—119)

This invention relates to the control of shunt field generators and more particularly to control of a plurality of such generators when operated individually or in parallel to supply power to a common load.

In certain types of service it is desirable that a plurality of shunt field generators driven by the same or individual prime movers be arranged to operate individually or in parallel to supply a load under the control of more or less conventional types of voltage regulators. When operated in parallel to supply the load, control of the generators by their individual voltage regulators has not been too satisfactory. Due to differences in the actual voltage settings between the associated voltage regulators of the respective generators, considerable unbalance in the division of the load current between the generators occurs. While special types of voltage regulators have been devised to improve the balance in the division of the load, their use has generally complicated the control systems and required the use of additional switching apparatus. A system affording improved balance with respect to division of the load current between parallel operated generators and permitting the use of conventional single operating coil voltage regulators in conjunction therewith has long been desired.

It is an object of the present invention to provide a control system of such character.

Another object is to provide a control system of the aforementioned type without impairing the operation of any generator, under the control of its associated voltage regulator, alone to supply the load, and Another object is to provide a control system of the aforementioned type which requires only conventional switching apparatus to effect changes from single to plural generator supply of the load.

Other objects and advantages of the invention will hereinafter appear.

The accompanying drawing illustrates a preferred embodiment of the invention which will now be described, it being understood that the embodiment illustrated is susceptible of modification in respect of its details without departing from the scope of the appended claims.

The single figure of the drawing is a diagrammatic showing of a power supply system together with a pair of shunt field generators and a control system for said generators.

Referring to the drawing, it shows a power supply system comprising a pair of generators 10 and 11 for supplying direct current power to bus bars 12 and 13 which in turn supply power to a battery 14 and a load 15 as shown. Generally considered the system is such that with either one of the generators operating alone or with both generators operating together in parallel direct current power will be supplied to bus bars 12 and 13 at the required voltage. The system shown is intended primarily for use on Diesel-electric or turbo-electric locomotives for supplying power to electrically operated auxiliaries thereon, although it is to be understood that the system may be used for other purposes.

It is assumed that generators 10 and 11 are substantially identical in construction and have equal ratings. Although not shown, it may be assumed that the generators are driven by the same prime mover or by prime movers which are individual to the generators.

As shown the generators are of the shunt field type and are provided respectively with shunt field windings $10^a$ and $11^a$. The generators have their negative terminals connected to the bus bars 12 in series with resistors $10^b$ and $11^b$ respectively. Resistors $10^b$ and $11^b$ should be of equal value and may take the form of separate resistances as shown, or the resistances may be inherent in each of the generator connections.

The generators are provided with voltage regulators 16 and 17 respectively for regulating their output voltage over their operating ranges. These regulators are shown as carbon pile regulators, but it is to be understood that any other suitable type may be used. It is assumed that the regulators shown are each of one of the conventional types of carbon pile voltage regulators, identical in construction, and, in so far as possible, substantially the same with respect to their actual voltage settings.

The regulators are provided with carbon pile resistance elements $16^a$ and $17^a$ respectively which are connected in series circuit relation with the shunt field windings of their associated generators. The regulators are also provided with operating coils $16^b$ and $17^b$ which are of equal internal resistance and which are connected at corresponding ends to the negative terminals of their associated generators. The other end of coil $16^b$ is connected to a point intermediate a pair of resistors 18 and 19 which are connected in a series circuit relation between the positive terminal of generator 10 and the negative terminal of generator 11. Similarly, the other end of coil $17^b$ is connected to a point intermediate a pair of resistors 20 and 21 which are connected in series circuit relation between the positive terminal of generator 11 and the negative terminal of generator 10. It is assumed that resistors 18 and 20 will be equal in value and similarly that resistors 19 and 21 will be equal in value.

As will be noted the aforedescribed connections for the operating coils $16^b$ and $17^b$ of regulators 16 and 17 differ from the conventional connection of the same which would be directly across the negative and positive terminals of their associated generators. In the present embodiment the coils are connected at one end to the negative terminals of their associated generators at the other end to the intermediate points of voltage dividers which are connected between the positive terminal of their associated generators and the negative terminal of the other generator; one such voltage divider comprising the resistors 18 and 19 and the other voltage divider comprising the resistors 20 and 21. As will be later more fully explained this arrangement affords improved balance in division of the load current between the generators when both are operating and connected to supply power to bus bars 12 and 13.

As is conventional, each of the generators is provided with a knife switch and a reverse current relay for controlling the connection of the generators across bus bars 12 and 13. Thus generator 10 has associated therewith a knife switch 22 and a reverse current relay 23 and similarly the generator 11 has associated therewith a knife switch 24 and a reverse current relay 25.

The advantages of the preferred control system hereinbefore described can best be shown by comparing the results that can be obtained thereby with the conventional arrangement of the voltage regulators under assumed sets of conditions which might be encountered in practice.

As a first case assume that instead of the arrangement shown and described herein, that the coils $16^b$ and $17^b$ respectively of regulators 16 and 17 are each directly connected across the positive and negative terminals of their associated generators in the conventional manner. Then the following equations will hold true for any given set of operating conditions when generators 10 and 11 are operated in parallel to supply the load:

$$E_1 - E_2 = V_1 - V_2 \quad (1)$$

$$V_b = \frac{V_1 + V_2}{2} - \frac{IR}{2} \quad (2)$$

$$I_1 - I_2 = \frac{V_1 - V_2}{R} \quad (3)$$

where $E_1$ is the terminal voltage of generator 10
$E_2$ is the terminal voltage of generator 11
$V_1$ is the actual voltage setting of regulator 16
$V_2$ is the actual voltage setting of regulator 17
$V_b$ is the bus voltage
$I_1$ is the current supplied by generator 10
$I_2$ is the current supplied by generator 11
$I$ is the total current supplied which equals $I_1 + I_2$
$R$ is the resistance of each of the resistors $10^b$ and $11^b$ respectively By way of a specific example, assume that the desired bus voltage is 75 volts, that although the rated voltage settings of the regulators is 75 volts the actual voltage setting of regulators 16 and 17 are 75.5 volts and 74.5 volts respectively, that the total load current is 150 amps, and that the resistors $10^b$ and $11^b$ are each .02 ohm. Then substituting these values in Equations 1, 2 and 3:

$$E_1 - E_2 = 75.5 - 74.5 = 1 \text{ volt}$$

$$V_b = \frac{75.5 + 74.5}{2} - \frac{150 \times .02}{2} = 75 - 1.5 = 73.5 \text{ volts}$$

$$I_1 - I_2 = \frac{75.5 - 74.5}{.02} = 50 \text{ amps.}$$

and since $$I_1 + I_2 = 150$$
$$I_1 = 100 \text{ amps.}$$
$$I_2 = 50 \text{ amps.}$$

Thus a 1 volt difference in the voltage setting of regulators 16 and 17 will cause a difference of 50 amps. between the current supplied by the generator 10 and that supplied by generator 11.

Now in considering the preferred control system hereinbefore described, the following equations can be derived by Ohm's and Kirchhoff's laws and will hold true for any given set of operating conditions when generators 10 and 11 are operated in parallel; provided, that the internal resistance of the operating coils $16^b$ and $17^b$ are equal, that resistance 18 and 20 are of equal ohmic value and that resistors 19 and 21 are of equal ohmic value:

$$E_1 - E_2 = \frac{(r_1 r_2 + r_1 r_3 + r_2 r_3)}{2 r_1 r_2 + r_2 r_3}(V_1 - V_2) \quad (4)$$

$$V_b = \frac{(r_1 r_2 + r_1 r_3 + r_2 r_3)}{2 r_2 r_3}(V_1 + V_2) - \frac{IR}{2} \quad (5)$$

$$I_1 - I_2 = \frac{(r_1 r_2 + r_1 r_3 + r_2 r_3)}{2 r_1 r_2 + r_2 r_3} \frac{(V_1 - V_2)}{R} \quad (6)$$

where $E_1$, $E_2$, $V_1$, $V_2$, $V_b$, $I$, and $R$ are the same as previously indicated for Equations 1, 2 and 3, and where:

$r_1$ is the ohmic value of each of the resistors 18 and 20
$r_2$ is the ohmic value of the internal resistance of coils $16^b$ and $17^b$
$r_3$ is the ohmic value of each of the resistors 19 and 21

One highly satisfactory system is afforded by making the resistors 18, 19, 20 and 21 one-half the ohmic value of the internal resistance of the coils $16^b$ and $17^b$ and thus Equations 4, 5 and 6 may be reduced to the following forms:

$$E_1 - E_2 = \frac{V_1 - V_2}{1.2} \quad (7)$$

$$V_b = 1.25(V_1 + V_2) - \frac{IR}{2} \quad (8)$$

$$I_1 - I_2 = \frac{V_1 - V_2}{1.2 R} \quad (9)$$

It will be apparent from Equation 8 that in order to maintain a bus voltage of 75 volts that the rated voltage settings of regulators 16 and 17 will have to be 30.6 volts (assuming $IR/2 = 1.5$ volts) instead of 75 volts.

By way of a specific example assume that with the preferred system of control (with the resistors 18, 19, 20 and 21 of equal ohmic value and equal to one-half the internal resistance of coils $16^b$ and $17^b$) that it is desired to maintain a bus voltage of 75 volts, that the rated voltage settings of regulators 16 and 17 is 30.6 volts, that the actual voltage settings of regulators 16 and 17 are 32.25 volts and 31.75 volts respectively. Further assume that the load current to be supplied by generators 10 and 11 is 150 amp. and that the resistors $10^b$ and $11^b$ are each .02 ohm. Then substituting the assumed values in Equations 7, 8 and 9

$$E_1 - E_2 = \frac{32.25 - 31.75}{1.2} = .417 \text{ volt}$$

$$V_b = 1.25(32.25 + 31.75) - \frac{150 \times .02}{2} = 78.5 \text{ volts}$$

$$I_1 - I_2 = \frac{32.25 - 31.75}{1.2 \times .02} = 20.87 \text{ amps.}$$

and since $I_1 + I_2 = 150$ amps.

$$I_1 = 85.43$$
$$I_2 = 64.57$$

The preferred control system thus affords a considerable improvement over the conventional system with respect to the division of the total load current between the two generators. Although the difference in the assumed actual voltage setting of the regulators was 1 volt in the example demonstrated in connection with the conventional system and only .5 volt in the example demonstrated in connection with the preferred system, the two differences are about the same when considered in percentages of the rated regulator voltage settings. Therefore a comparison of the results is believed to be in order. Even if the assumed actual voltage settings of the regulators used in the example worked out in connection with the preferred system were chosen to have a difference of 1 volt, there would still be an improvement in the division of the load current between the two generators.

The control system in no way impairs the operation of either of the generators alone to supply the load at substantially the desired voltage. All that is necessary is to disconnect the idle generator from the load circuit and the other generator will supply the load alone under the control of its associated voltage regulator.

When one of the generators is supplying the load alone and the other is disconnected from the load circuit, then the following general equation for the bus voltage derived by Ohm's and Kirchhoff's laws will hold true for any given set of operating conditions.

$$V_b = \frac{(r_1 r_2 + r_1 r_3 + r_2 r_3)}{r_2 r_3} V_{sr} - \frac{(r_1 + r_3)}{r_3} IR \quad (10)$$

Where $V_b$, $I$, $R$, $r_1$, $r_2$, and $r_3$ are as previously indicated, and where:

$V_{sr}$ is the actual voltage setting of the voltage regulator

If $r_1$ is equal to $r_3$ and each of the same is equal to one-half the ohmic value of $r_2$, then Equation 10 may be reduced to the following form:

$$V_b = 2.5 V_{sr} - 2IR \quad (11)$$

By way of example, assume that generator 11 is idle and disconnected from bus bars 12 and 13. Also assume that resistors 18 and 19 are of equal ohmic value and equal to one-half the internal resistance of coil $16^b$. Further assume that the actual voltage setting of regulator 16 is 32.25 volts, that the load current is 150 amps. and that the resistor $10^b$ is .02 ohm. Substituting in Equation 11:

$$V_b = (2.5 \times 32.25) - (2 \times 150 \times .02)$$
$$V_b = 80.63 - 6 = 74.63 \text{ volts}$$

Thus generator 10 operating alone is capable of supplying the rated load at substantially the desired bus voltage. Similarly it can be shown that generator 11 operating alone will function in a like manner.

While in connection with the preferred control system hereinbefore described the generators involved were assumed to be of qual ratings, this system may be also used in connection with generators of unequal ratings with the same beneficial results if the resistors $10^b$ and $11^b$ are made proportional in ohmic value to the ratings of their respective associated generators.

What I claim as new and desire to secure by Letters Patent is:

1. The combination with first and second generators having shunt field windings, first and second buses with the first of which the armatures of said generators have for like terminals individual connections including resistance proportional to the respective generator ratings and means for connecting other like terminals of said generators in parallel or singly to said second bus, of interconnections between armature terminals of each generator and the opposite armature terminals of the other generator, voltage dividers individualized to said interconnections, and separate shunt field regulators for said generators, said regulators having individual control windings connected between the first mentioned armature terminals of their respective generators and taps of the voltage dividers connected to the second mentioned armature terminals of their respective generators.

2. The combination with equally rated first and second generators having shunt field windings, first and second buses with the first of which the armatures of said generators have for like terminals individual connections including equal values of resistance and means for connecting other like terminals of the armatures of said generators in parallel or singly to said second bus, of interconnections between armature terminals of each generator and the opposite armature terminals of the other generator, like voltage dividers individualized to said interconnections, and separate shunt field regulators for said generators, said regulators having individual control windings connected between the first mentioned armature terminals of their respective generators and like taps of the voltage dividers connected to the second mentioned armature terminals of their respective generators.

ROBERT O. PERRINE.

No references cited.